April 14, 1953 J. LAMONT 2,635,135
APPARATUS FOR TESTING MULTICONDUCTOR CABLES
Filed Jan. 28, 1950
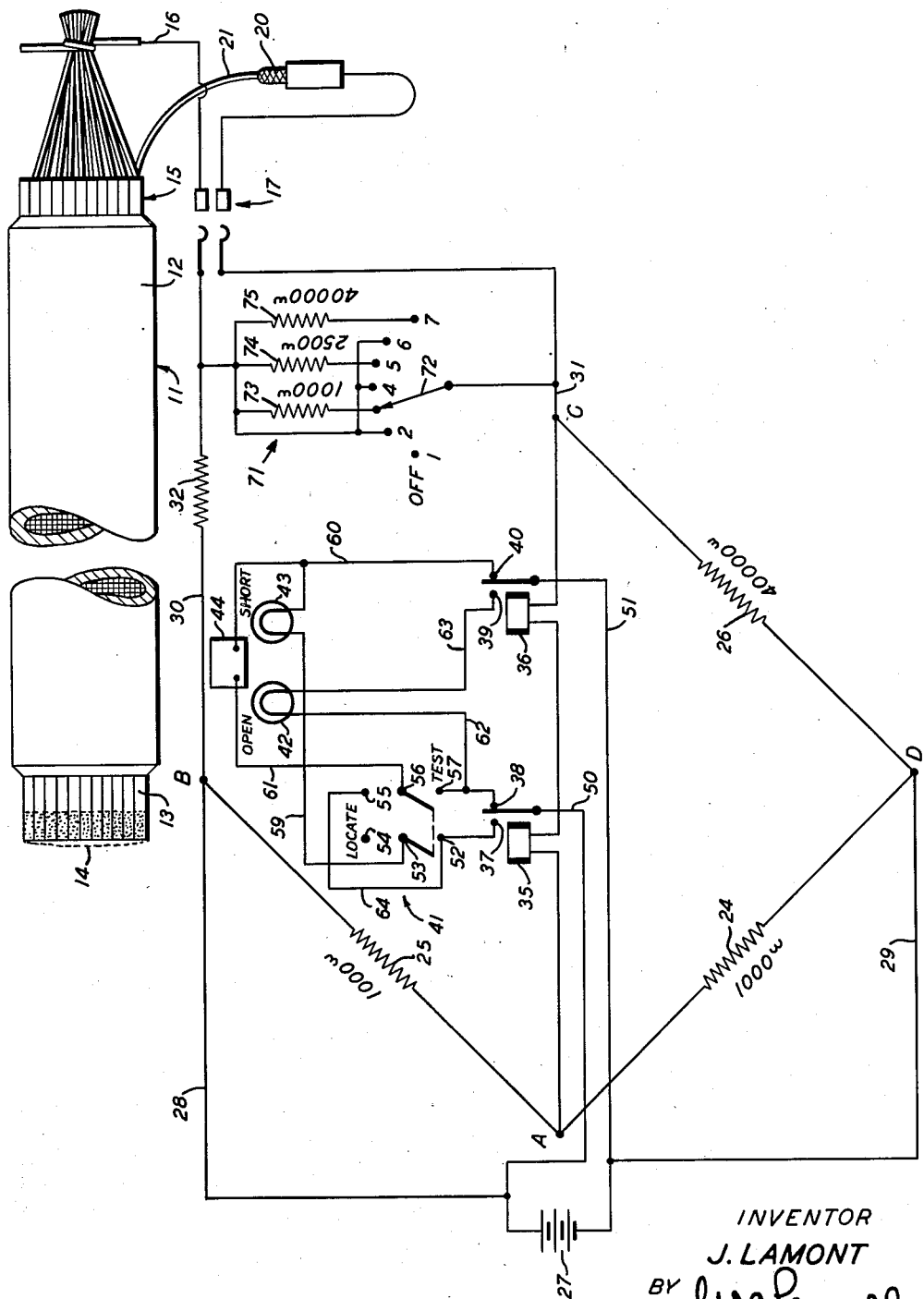
INVENTOR
J. LAMONT
BY W.C. Parnell
ATTORNEY Patented Apr. 14, 1953

2,635,135

UNITED STATES PATENT OFFICE 2,635,135

APPARATUS FOR TESTING MULTICON-DUCTOR CABLES

John Lamont, North Arlington, N. J., assignor to Western Electric Company, Incorporated, New York, N. Y., a corporation of New York Application January 28, 1950, Serial No. 141,133

6 Claims. (Cl. 175—183)

This invention relates to electrical testing and more particularly to a device for testing electrical cable conductors for open and short circuits. It is an object of the invention to enable accurate tests of this type to be carried out in a rapid manner.

The method generally used in testing the individual conductors in a cable for short and open circuits involves handling each conductor twice. The insulation is removed from the conductors at one end of the cable and the bare ends are bonded together with a conductive piece of material. This bond is connected to an alarm box which contains both an alarm and a source of electrical potential which causes the alarm to sound when a circuit is completed across the voltage source. The connection to the bond forms one side of the signal circuit and the other side is a test pick and cord, which removes the particular conductor to be tested from the body of the cable.

Testing cable conductors by this method has the obvious disadvantage of requiring two manipulations per conductor, since short circuits and open circuits must be tested at opposite ends of the cable. This causes an increase in the time required for testing cables which greatly adds to the cost of the testing operation. In addition, the tester must place all of the conductors within the bond again, after the short circuit tests have been completed, before he can go to the opposite end to proceed with the test for continuity.

In related application Serial No. 74,568, now Patent No. 2,568,161, filed February 6, 1949, by A. J. Meyerhoff and J. H. Sulzer, a method was disclosed for testing the individual conductors of a cable for both short and open circuits with the same manipulation. As described in the application referred to, this is accomplished by connecting all of the conductors at one end of the cable together with a semi-conductive impregnation to form a plurality of conductive loops, each having a resistance greater than the combined resistance of the two individual conductors forming a part of each loop, but less than the loop insulation resistance.

Applicant has devised a method of and apparatus for testing cable incorporating this principle in a device which provides a sensitive and quick acting means for making these tests. In the preferred embodiment, the conductors at one end of the cable are bared and bonded together, and the far ends of the conductors are all connected together by a semi-conductive impregnation to form a plurality of conductive loops, each having a resistance greater than the combined resistance of the two individual conductors forming a part of each loop, but less than the loop insulation resistance. The bond and a test pick used for removing individual conductors from the bond for test are connected to adjacent terminals of a Wheatstone bridge to make the resistance of the test loop the unknown arm of the bridge. Indicators are actuated, according to the condition of the conductor under test, by means of relays in series across one diagonal of the bridge.

Other advantages and features will be apparent from the following detailed description taken in conjunction with the attached drawing in which:

The figure is a combination pictorial and schematic diagram of the invention.

With reference to the drawing, the cable to be tested is designated generally as 11. The cable sheath 12 is removed from both ends of the cable as shown. One end 13 of the cable which in the test is the far end, is cut off square and impregnated with a semi-conducting liquid solution such as a mixture of borax and glycerin, or with a suitable semi-conducting paste. This impregnation 14 has the effect of providing a conductive path between the end of each conductor and the end of every other conductor in the cable, so that any two conductors will form a loop. The solution used for impregnation is chosen for its properties as a semi-conductor, so that the resistance of the effective loop thus formed will be appreciably higher than the resistance of the loop which would be formed if two of the individual conductors were to have their bare ends joined at the impregnated end of the cable, which would be approximately the condition present if the cable were to have a short circuit between two of its conductors occurring near this far end.

The conductors at end 15 of the cable, which during the actual test would be the near end, are stripped of their insulation and are all joined together by a bond 16, such as, for example, a loop of copper wire, which is kept taut to keep the conductors at this end pressed closely together. This bond is connected to one terminal of a test jack 17. A test pick 20 is used to pick the individual conductors, such as conductor 21, out of the bond in order to test it for open and short circuits, the test pick being connected to a second terminal in the jack 17.

The cable testing device includes a Wheatstone type bridge having conventional terminals A, B, C, and D. Three arms of the bridge are constituted by the resistances 24, 25, and 26, which, in the embodiment here shown, have resistance values of 1,000, 1,000 and 40,000 ohms, respectively. Potential for operating the bridge is supplied by a battery 27 or any other suitable source of direct current, the potential being applied across the B and D terminals of the bridge by means of leads 28 and 29.

The fourth arm of the Wheatstone bridge is the loop of cable under test, one side of the loop being the particular conductor held by the test pick 20, and the other side of the loop being the bonded conductors held by the strap 16, these bonded conductors being electrically connected to the particular conductor 21 under test by the semi-conducting solution or paste 14 which is applied to the far end of the cable. Leads 30 and 31 connect the two sides of the conductive loop under test from the terminals of test jack 17 to the B and C terminals of the bridge. A resistance 32 having a value of 1,000 ohms is connected in the lead 30, for the purpose of limiting the current which would result from a short circuit at the near end of the cable.

Two relays 35 and 36 are connected in series between the A and C terminals of the bridge. These two relays, which are normally released, are polarized in opposite directions as shown, with the result that each will only operate when a current of sufficient magnitude passes through its winding in the proper direction. Relay 35 is provided with contacts 37 and 38 while relay 36 is provided with contacts 39 and 40. A two-pole double-throw switch 41, indicating lamps 42 and 43, and a buzzer 44 are associated with and operated by the relay contacts as described later to provide visual or audible indication of the condition of the conductor undergoing test.

In testing the conductors of an electrical cable by means of the proposed test set, the handle of the switch 41 is first moved to the position marked "Test." With the switch in this position, the test pick 20 is then applied to the cable to pull out a conductor 21 to be tested. When the test pick first makes contact with the bare bonded conductors at the near end of the cable, a short circuit condition exists, and the impedance between bridge terminals B and C falls to approximately 1,000 ohms, as determined by the value of resistance 32 connected in the lead 30. Since the resistance arm 26 has a value of 40,000 ohms, the bridge is unbalanced in the direction to produce a relatively large unbalance current through relays 35 and 36 from terminal C to terminal A. Relay 36 is polarized against operation by current in this direction and remains released, but relay 35, which is polarized in the opposite direction, will be operated by the surge of current and cause its movable contact to make against contact 37. Power to the indicating circuit, which is supplied from the source 27 through leads 50 and 51, then causes the Short lamp 43 to light through a circuit extending through contact 37 of relay 35, contacts 52 and 53 of switch 41, lead 59, indicating lamp 43, lead 60, and through normal contact 40 of relay 36 to the lead 51. This initial short indication has no significance with regard to the condition of the conductor being tested.

When a good conductor 21 is pulled away from the bond by the test pick 20, the conductor loop resistance and the resistance of the solution or coating 14 is added to the BC arm of the bridge. The resistance of this arm will now increase due to the inclusion of this impregnation resistance, the actual value, exclusive of resistance 32, varying between approximately 2,500 ohms and 40,000 ohms, depending upon whether the particular conductor is among the first or last to be tested. If it is among the last, only a few wires will be in the bond to form the other half of the test loop, and these may be spaced at the opposite side of the cable, causing a maximum length of the impregnation to be included in the conductive loop, with a resulting increase in loop resistance. Because of the discrepancy in the normal value of this arm and the 40,000 ohm value of bridge arm 26, the bridge will remain unbalanced, except for an actual balance condition corresponding to the maximum BC arm resistance of 40,000 ohms, in the same direction as for a shorted condition, and relay 36 will remain released as the resulting current is still in the wrong direction. The unbalance current is in the right direction for the operation of relay 35, but the relay is selected so that the smaller unbalance currents resulting from a good conductor are insufficient to maintain it in an operated condition, and it will release. With both relays 35 and 36 released, the buzzer 44 is actuated to indicate a good conductor over a circuit extending through lead 50, normal contact 38 of relay 35, contacts 56 and 57 of switch 41, lead 61, the buzzer 44, lead 60, and through normal contact 40 of the relay 36 to lead 51.

If the conductor 21 being tested is shorted across another conductor in the cable, the semi-conducting solution 14 is by-passed and its resistance is not added to the resistance of bridge arm BC. The same shorted condition will obtain as when the test pick first made contact with the bonded group of conductors to initiate the test, and the 1,000 ohm resistance of element 32 plus the resistance of the shorted loop will be the only effective resistance in the BC arm of the bridge, and the resulting unbalance will operate relay 35 and cause the Short indicating lamp 43 to indicate a short circuit condition in the same manner as previously described.

On the other hand, if the conductor under test should contain an open circuit, the impedance between terminals B and C as the conductor is removed from the bond will be extremely high, so high in comparison with the 40,000 ohm value of resistance 26 in the arm DC that this resistance 26 and relays 35 and 36 will be effectively in series across the resistance 24, and that the bridge will now be unbalanced in the other direction. That is, the unbalance current will now flow from terminal A to terminal C. This unbalance current will be in the wrong direction for relay 35, which will release, but is in the right direction for relay 36, which will operate and cause its movable contact to make against contact 39, the two relays being adjusted so that relay 36 will operate simultaneously with the release of relay 35. The Open lamp 42 will now be energized by a circuit extending through lead 50, normal contact 38 of relay 35, lead 62, Open light 42, lead 63 and through make contact 39 of relay 36 to the lead 51.

To summarize the foregoing operations, when the test pick first makes contact with the bonded end of the cable preparatory to picking out a conductor for test, a short circuit condition will exist, which will cause the Short lamp to be energized. If the conductor to be tested is good, the buzzer will be energized when the conductor is disconnected from the bond. The silence of the buzzer on removing a conductor from the bond will indicate that a short or open circuit exists in the conductor, the particular fault present being indicated on either the Short or Open lamp.

One main feature of the invention is the adjustment of the testing circuit and associated relays to differentiate among the possible conditions of the conductor under test. For example, in the embodiment presented herein, relay 35 is caused to be operated by the unbalance current resulting from a short circuit condition, and relay 36 is operated by the oppositely directed unbalance current resulting when the conductor has an open circuit, but both relays are caused to be or remain released during unbalance currents corresponding to the resistance range of good conductors, that is, between 2,500 and 40,000 ohms.

In actual practice, it has been found that making the value of resistance 26 approximately 10,000 ohms instead of 40,000 ohms will simplify somewhat the problem of adjusting the relays to discriminate among the various possible conditions of the cable conductors, since the smaller resistance value of arm 26 will result in larger unbalance currents to actuate the two relays. Although this means that the direction of the unbalance current will reverse in passing through the resistance range of good conductors from 2,500 ohms to approximately 40,000 ohms, relay 35 will still release when a good conductor is removed from the bond, as the current in one direction is insufficient to operate it and in the other direction is against its polarity. On the other hand, relay 36 will not operate during this range as the current before reversal is in the wrong direction and the relay is adjusted so that the current after reversal will be insufficient to operate it until the resistance in the arm BC is approximately 50,000 ohms or greater.

Calibrating device 71 is provided to simulate the various conditions of the cable conductors for the purpose of calibrating and checking the operation of the test set before the cable has been connected to the jack 17. This calibrating device includes a switch arm 72 making contact with seven different positions, each forming a different connection between the B and C terminals of the bridge. Switch position 3 is connected to a resistance 73 having a value of 1,000 ohms, position 5 is connected to a resistance 74 with a value of 2,500 ohms and position 7 is connected to a resistance of 40,000 ohms. The first or Off position of the switch corresponds either to a situation of having no cable connected to the jack, or to an open circuit condition in a conductor under test. The result in either of these two cases would be a resistance approaching infinity between the terminals B and C of the bridge, which would cause the Open lamp to light. In position 2, the only resistance in the BC arm of the bridge is the 1,000 ohm resistance of element 32, and the Short lamp should light. In position 3, with 1,000 ohms added to the bridge arm to make a total of 2,000 ohms, the Short lamp should still light to indicate a condition corresponding to a short circuit at the far end of the conductor through the maximum loop resistance of the cable independent of the resistance of the impregnation 14. When the switch 72 is moved to either position 5 or 7, an additional resistance of 2,500 or 40,000 ohms respectively is included in the bridge arm BC. If the resistance of a conductor loop undergoing test is between approximately 2,500 and 40,000 ohms, the conductor can be neither shorted nor open and the buzzer therefore should sound in both positions 5 and 7. Since the test always starts with a short circuit indication when the test pick first makes contact with the bonded end of the cable, positions 4 and 6 are made the same as position 2 so as to simulate this short circuit condition before each other condition is simulated as per positions 3, 5, and 7.

Before starting the actual testing operation, the operator will first test the response of the bridge circuit and indicating devices by consecutively running through each of the seven positions of the calibrating device 71. If the proper signal is indicated for each of these positions, the switch 72 is moved to Off position 1, and the cable to be tested is connected to the test jack 17.

When one or more wires of the cable are found to contain a short circuit, it is necessary to locate and mark the other conductors with which they are shorted. To assist in this operation, the impregnation or coating 14 is removed as by cutting off a short section of cable, and the switch 41 is moved upward to the position marked Locate. This will cause the buzzer to be connected as an audible short circuit indicator in place of Short lamp 43, as it will now be connected to contact 37 of relay 35 through lead 61, contacts 56 and 55 of switch 41, and lead 64. The other wire or wires with which the conductor under test is shorted are then located by a simple continuity test in which the test conductor is connected to terminal C of the bridge and the ends of the other wires are successively connected to terminal B until the shorted wire is identified by the buzzer.

Although relay 35 has been described as a polarized relay which would not operate on an open circuit condition because of the unbalance current being in the wrong direction, the same result could be obtained by the use of a marginal type relay which would remain released when insufficient energizing current was passed through the relay winding. If a marginal type relay were to be used in the invention as described, the circuit would be designed so that the unbalance current in the bridge would be sufficient to operate the relay when a short circuit condition existed, but would be insufficient to maintain it in an operated condition when the conductor under test was good or contained an open circuit.

Applicant's invention enables a quick, accurate and sensitive test for short circuits and open circuits to be made on cable conductors. By the use of a Wheatstone bridge, a large change in actuating current is obtained for relatively small changes in resistance values.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In apparatus for testing cables having a plurality of insulated conductors, the combination with means for electrically bonding the conductors together at one end of the cable, a test pick for withdrawing the conductors singly from the bond, and means including a semi-conductive substance applied to the end of the cable opposite the said one end for controlling the resistance of the test loop thus formed to differentiate between the possible conditions of the conductors, of a Wheatstone bridge having three known arms and having the test loop connected to two adjacent terminals to comprise the unknown arm of the bridge, a pair of normally released relays connected in series across one diagonal of the bridge, one of said relays being operated by a loop resistance corresponding to a short circuit and the other being operated by a loop resistance corresponding to an open circuit, with both relays being released when the loop resistance corresponds to a satisfactory conductor, indicating means actuated by the relays according to the condition of the conductor under test, and means connectible across the said adjacent terminals to test the operation of the relays by simulating various possible conditions of said conductor.

2. In apparatus for testing cables having a plurality of insulated conductors, the combination with means for electrically bonding the conductors together at one end of the cable, a test pick for withdrawing the conductors singly from the bond, and means including a semi-conductive substance applied to the end of the cable opposite the said one end for controlling the resistance of the test loop thus formed to differentiate between the possible conditions of the conductors, of a Wheatstone bridge having three known arms and having the test loop connected to two adjacent terminals to comprise the unknown arm of the bridge, a pair of polarized relays connected in series across one diagonal of the bridge whose operation is determined by the magnitude and direction of the unbalance current through said diagonal, indicating means actuated by the relays according to the condition of the conductor under test, and a fixed resistance connected into the test loop to limit the current resulting when the conductor under test contains a short circuit.

3. In apparatus for testing cables having a plurality of insulated conductors, the combination with means for electrically bonding the conductors together at one end of the cable, a test pick for withdrawing the conductors singly from the bond, and means including a semi-conductive substance applied to the end of the cable opposite the said one end for controlling the resistance of the test loop thus formed to differentiate between the possible conditions of the conductors, of a Wheatstone bridge having three known arms and having the test loop connected to two adjacent terminals to comprise the unknown arm of the bridge, a pair of normally released polarized relays connected in series across one diagonal of the bridge whose operation is determined by the magnitude and direction of the unbalance current through said diagonal, one of said relays being operated by a loop resistance corresponding to a shirt circuit and the other being operated by a loop resistance corresponding to an open circuit, with both relays being released when the loop resistance corresponds to a satisfactory conductor, visual means actuated by the relays to indicate a short circuit or open circuit, audible means actuated by the relays to indicate a satisfactory conductor, a fixed resistance connected into the test loop to limit the current resulting when the conductor under test contains a short circuit, and means connectible across the said adjacent terminals to test the operation of the relays by simulating various possible conditions of said conductor.

4. In apparatus for testing cables having a plurality of insulated conductors, the combination with means for electrically bonding the conductors together at one end of the cable, a test pick for withdrawing the conductors singly from the bond, and means including a semi-conductive substance applied to the end of the cable opposite the said one end for controlling the resistance of the test loop thus formed to differentiate between the possible conditions of the conductors, of a Wheatstone bridge having three known arms and having the test loop connected to two adjacent terminals to comprise the unknown arm of the bridge, a pair of normally released relays connected in series across one diagonal of the bridge, one of said relays being operated by a loop resistance corresponding to a short circuit and the other being operated by a loop resistance corresponding to an open circuit, with both relays being released when the loop resistance corresponds to a satisfactory conductor, indicating means actuated by the relays according to the condition of the conductor under test, means connectible across the said adjacent terminals to test the operation of the relays by simulating various possible conditions of said conductor, and means for determining which of the other conductors is shorted across the conductor under test, where this condition has been indicated.

5. In apparatus for testing cables having a plurality of insulated conductors, the combination with means for electrically bonding the conductors together at one end of the cable, a test pick for withdrawing the conductors singly from the bond, and means including a semi-conductive substance applied to the end of the cable opposite the said one end for controlling the resistance of the test loop thus formed to differentiate between the possible conditions of the conductors, of a Wheatstone bridge having three known arms and having the test loop connected to two adjacent terminals to comprise the unknown arm of the bridge, a pair of normally released polarized relays connected in series across one diagonal of the bridge whose operation is determined by the magnitude and direction of the unbalance current through said diagonal, one of said relays being operated by a loop resistance corresponding to a short circuit and the other being operated by a loop resistance corresponding to an open circuit, with both relays being released when the loop resistance corresponds to a satisfactory conductor, visual means actuated by the relays to indicate a short circuit or open circuit, audible means actuated by the relays to indicate a satisfactory conductor, a fixed resistance connected into the test loop to limit the current resulting when the conductor under test contains a short circuit, means connectible across the said adjacent terminals to test the operation of the relays by simulating various possible conditions of said conductor, and means for determining which of the other conductors is shorted across the conductor under test, where this condition has been indicated.

6. In an apparatus for testing cables having a plurality of insulated conductors, the combination with means for electrically bonding the conductors together at one end of the cable, a test pick for withdrawing the conductors singly from the bond, and means at the other ends of the conducors for establishing therebetween conductive paths each having a resistance greater than the loop resistance but less than the insulation resistance of the conductors, of a Wheatstone bridge having three known arms and means for connecting the bond and the test pick to the terminals of the fourth arm of the bridge, a source of potential connected across one diagonal of the bridge, three indicators for indicating open, short-circuited and good conditions of a conductor withdrawn by the test pick and means for selectively operating the indicators comprising a marginal relay and a sensitive polarized relay connected in series across the other diagonal of the bridge.

JOHN LAMONT.

References Cited in the file of this patent
UNITED STATES PATENTS

| Number | Name | Date |
|---|---|---|
| 1,034,609 | Friendly | Aug. 6, 1912 |
| 1,276,589 | Steinmetz | Aug. 10, 1918 |
| 2,083,920 | Powell | June 15, 1937 |
| 2,153,989 | Paulson | Apr. 11, 1939 |
| 2,456,499 | Fritzinger | Dec. 14, 1948 |
| 2,568,161 | Meyerhoff | Sept. 18, 1951 |